(12) United States Patent
Zauritz et al.

(10) Patent No.: US 7,850,200 B2
(45) Date of Patent: Dec. 14, 2010

(54) AIRBAG AND A MOTOR VEHICLE

(75) Inventors: Ralf Zauritz, Holzkirchen (DE); Stefan Hauser, Haimhausen (DE); Jurgen Weyand, Weichs (DE); Christian Miksits, Iserlohn (DE)

(73) Assignee: Autoliv Development AB, Vargarda (SE)

( * ) Notice: Subject to any disclaimer, the term of this patent is extended or adjusted under 35 U.S.C. 154(b) by 600 days.

(21) Appl. No.: 10/588,521

(22) PCT Filed: Aug. 27, 2005

(86) PCT No.: PCT/EP2005/009260

§ 371 (c)(1), (2), (4) Date: Jun. 21, 2007

(87) PCT Pub. No.: WO2006/024472

PCT Pub. Date: Mar. 9, 2006

(65) Prior Publication Data

US 2007/0273133 A1    Nov. 29, 2007

(30) Foreign Application Priority Data

Sep. 1, 2004    (DE) .................. 10 2004 042 209
Oct. 6, 2004    (DE) .................. 10 2004 048 898

(51) Int. Cl.
   *B60R 21/239* (2006.01)
(52) U.S. Cl. .................. 280/740; 280/730.2
(58) Field of Classification Search .......... 280/729, 280/736, 740, 730.2
   See application file for complete search history.

(56) References Cited

U.S. PATENT DOCUMENTS

| | | | | |
|---|---|---|---|---|
| 3,887,213 A | * | 6/1975 | Goetz | .................. 280/738 |
| 5,310,215 A | * | 5/1994 | Wallner | .................. 280/739 |
| 5,931,497 A | * | 8/1999 | Fischer | .................. 280/743.1 |
| 6,419,267 B1 | * | 7/2002 | Hashimoto et al. | ....... 280/743.1 |
| 6,554,313 B2 | * | 4/2003 | Uchida | .................. 280/729 |

(Continued)

FOREIGN PATENT DOCUMENTS

DE    4137810 C1    4/1993

(Continued)

OTHER PUBLICATIONS

International Search Report—PCT/EP2005/009260-mailed on Nov. 30, 2005.

*Primary Examiner*—Faye M. Fleming
*Assistant Examiner*—Karen A Beck
(74) *Attorney, Agent, or Firm*—Brinks Hofer Gilson & Lione

(57) ABSTRACT

An airbag for a motor vehicle capable of adjusting its internal pressure to the size of a vehicle occupant and to the accident situation. This adaptation is achieved by purely passive means. The airbag includes an airbag cover enclosing a gas chamber and also has at least one venting arrangement which connects the gas chamber with an external environment. Gas flow through the venting arrangement is throttled or blocked when a certain area of the airbag cover meets an obstacle. The venting arrangement includes at least one opening in the airbag cover and a tube which is connected with the airbag cover. The at least one opening ends in the tube, and the tube includes an exit opening to the external environment.

17 Claims, 9 Drawing Sheets

U.S. PATENT DOCUMENTS

| | | | |
|---|---|---|---|
| 6,712,384 B2* | 3/2004 | Abe | 280/730.1 |
| 6,817,624 B2* | 11/2004 | Lorenz et al. | 280/728.2 |
| 6,863,304 B2* | 3/2005 | Reiter et al. | 280/739 |
| 7,017,945 B2* | 3/2006 | DePottey et al. | 280/739 |
| 7,347,450 B2* | 3/2008 | Williams et al. | 280/739 |
| 7,475,904 B2* | 1/2009 | Hofmann et al. | 280/739 |
| 7,523,891 B2* | 4/2009 | Hakki et al. | 244/152 |
| 7,635,148 B2* | 12/2009 | Sager | 280/739 |
| 7,651,130 B2* | 1/2010 | Bauberger | 280/743.2 |
| 2002/0096869 A1 | 7/2002 | Kai et al. | |
| 2003/0020268 A1* | 1/2003 | Reiter et al. | 280/742 |
| 2003/0168836 A1 | 9/2003 | Sato et al. | |
| 2005/0184493 A1* | 8/2005 | Hofmann et al. | 280/730.2 |
| 2007/0052222 A1* | 3/2007 | Higuchi et al. | 280/738 |
| 2007/0057492 A1* | 3/2007 | Feller et al. | 280/730.2 |
| 2007/0187932 A1* | 8/2007 | Sekizuka | 280/730.1 |
| 2009/0014989 A1* | 1/2009 | Henderson et al. | 280/730.2 |
| 2009/0189374 A1* | 7/2009 | Fukawatase et al. | 280/740 |

FOREIGN PATENT DOCUMENTS

| | | |
|---|---|---|
| DE | 19714266 A1 | 11/1997 |
| DE | 10018170 A1 | 10/2001 |
| DE | 10111566 A1 | 9/2002 |
| DE | 10136173 A1 | 2/2003 |
| EP | 07000808 A1 | 6/1995 |
| EP | 1338480 A2 | 8/2003 |
| EP | 1044855 B1 | 12/2003 |
| EP | 1 568 544 A1 | 8/2005 |
| JP | 2002-79905 A | 3/2002 |

* cited by examiner

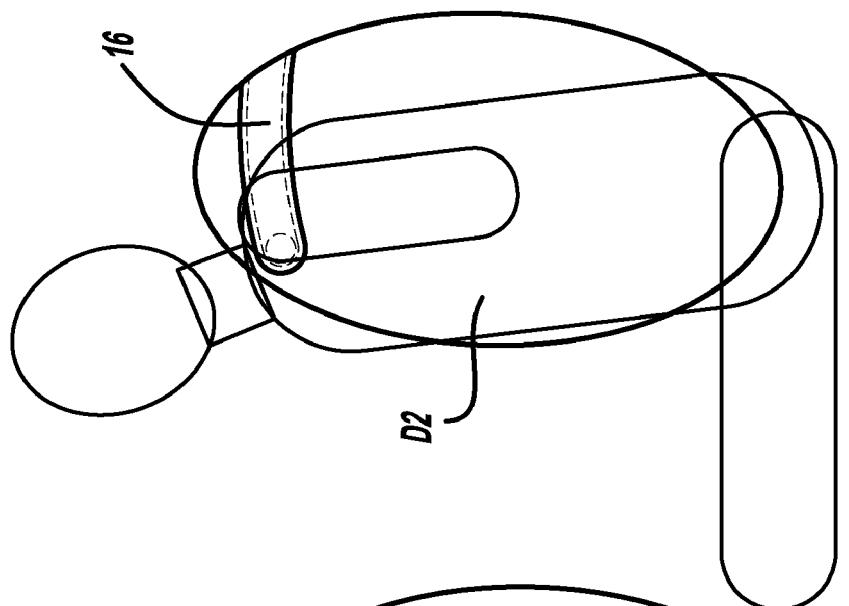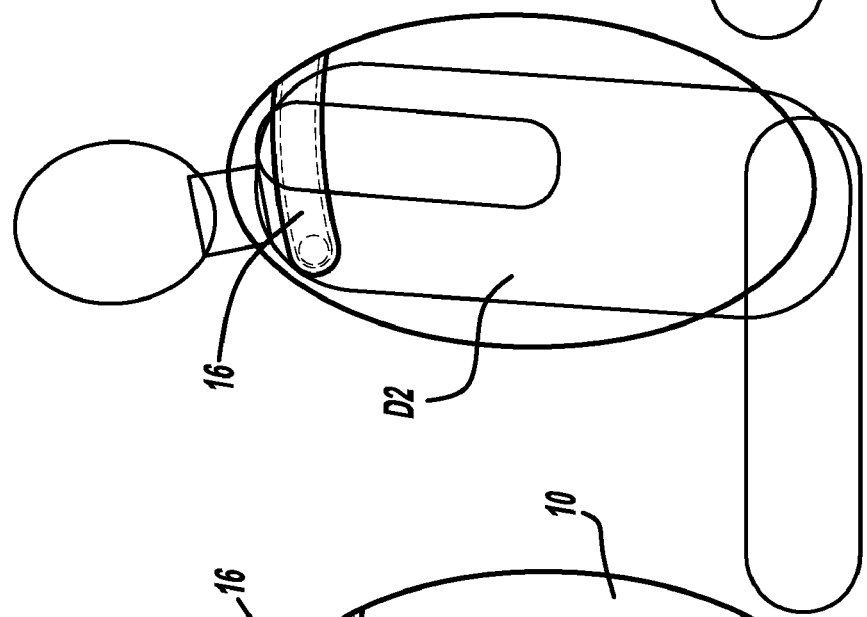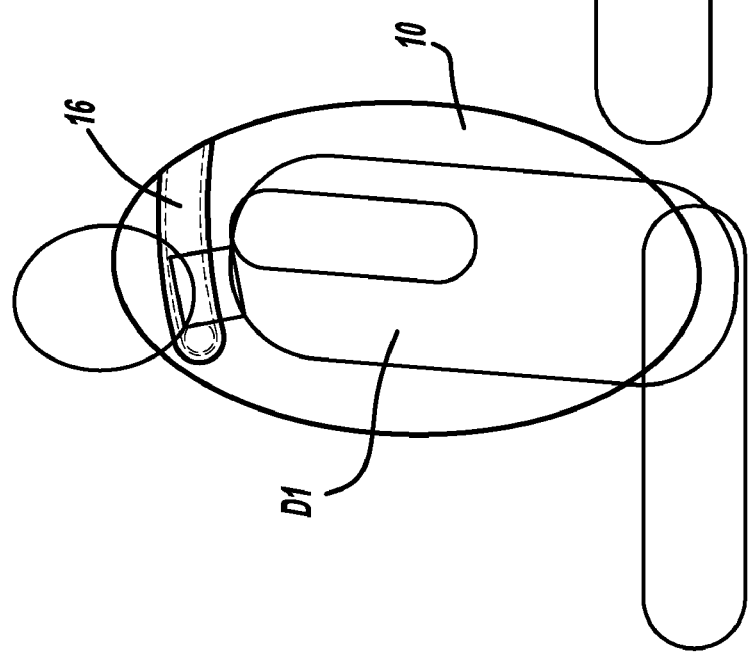

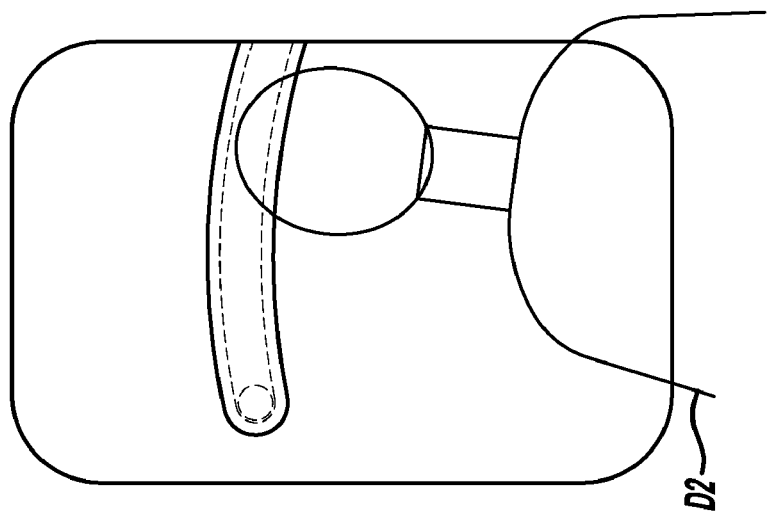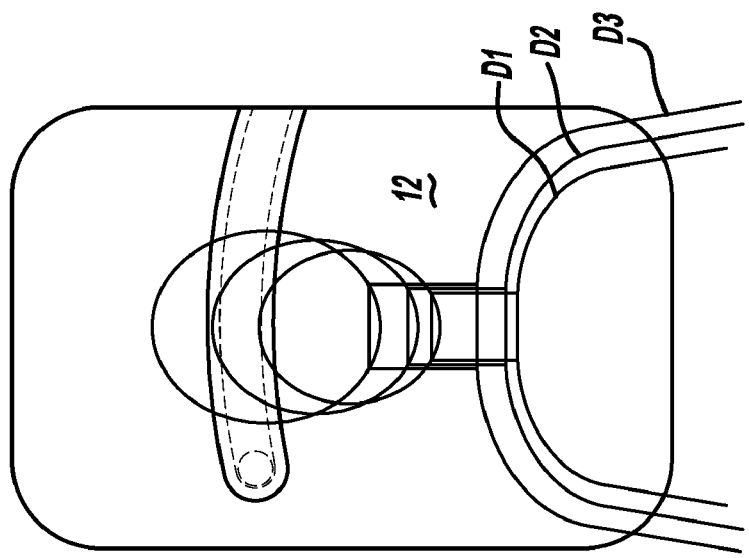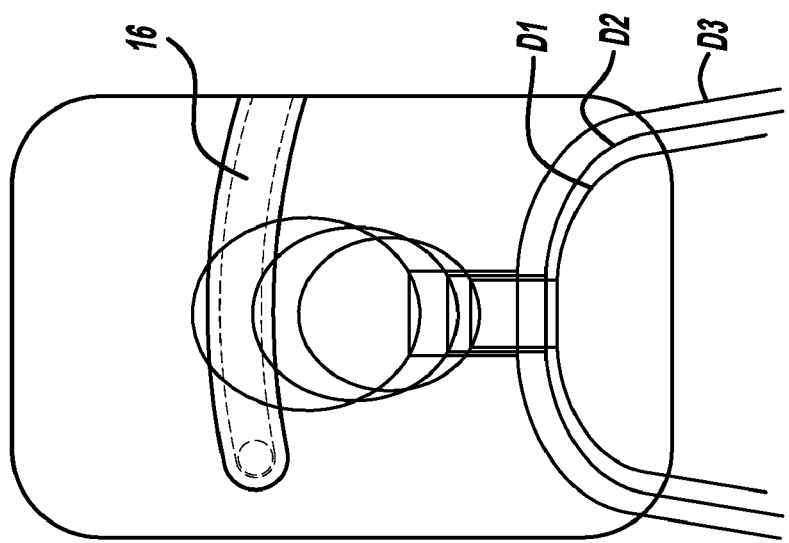

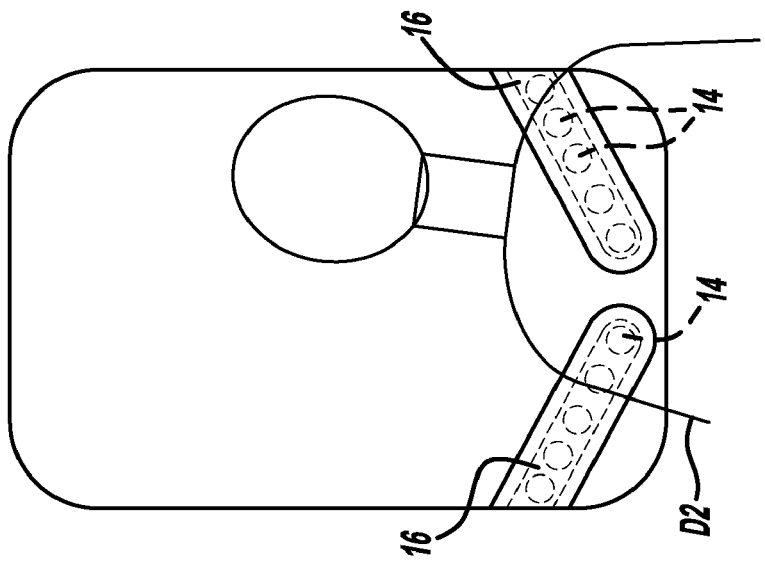
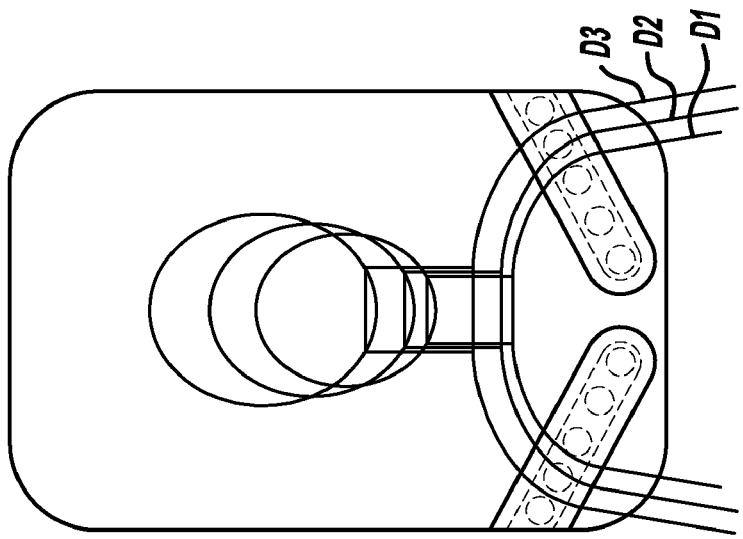
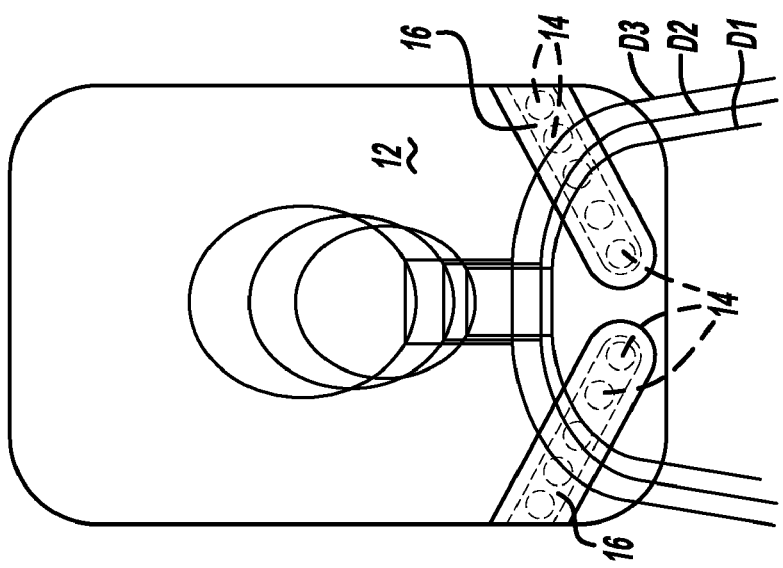

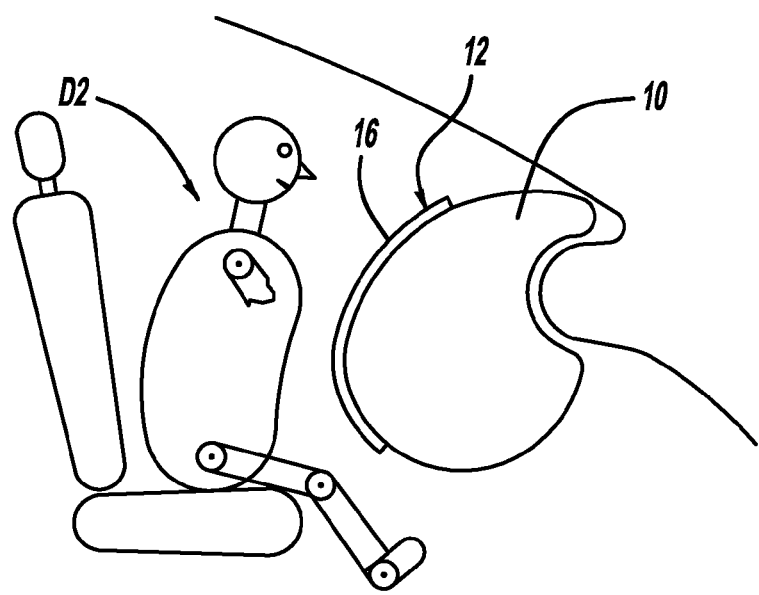
*FIG - 16*
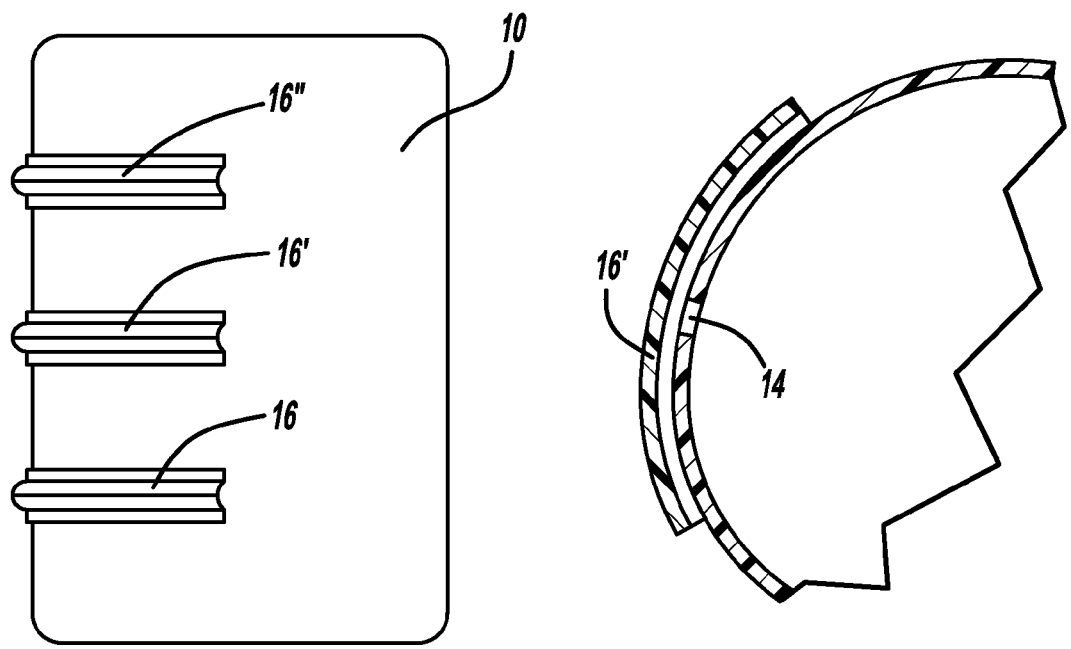
*FIG - 17*
*FIG - 18*

AIRBAG AND A MOTOR VEHICLE

CROSS REFERENCE TO RELATED APPLICATIONS

This application claims priority to German patent applications 102004042209.5, filed Sep. 1, 2004 and 102004048898.3, filed Oct. 6, 2004 and PCT/EP2005/009260, filed Aug. 27, 2005.

BACKGROUND

1. Field of the Invention

The present invention relates to an airbag for use in a motor vehicle. More particularly, the present invention relates to a front or side airbag having passive internal pressure regulation.

2. Description of Related Art

Airbags which do not have any mechanisms for situation-dependent regulation of the internal pressure are only ideal for a vehicle occupant of a certain weight and height in certain specific accident situations. For different size occupants accidents in different accident situations from those specified, the airbag is either too hard or too soft. If, for example, such an unregulated airbag is designed for a male wearing a seat belt who is 1.80 m tall and who weighs 80 kg, such an airbag will be too hard for a female wearing a seat belt who is 1.65 m tall and weighs 60 kg and too soft for the male described above not wearing a seat belt.

In order to counteract this problem, airbags are known with at least one passive venting arrangement via which the gas can exit from the airbag and regulate the pressure. The gas stream can be throttled by this venting arrangement depending on the situation. In addition, active systems exist where, for example, sensors measure the weight of the occupants and electrically adjust the effective cross-section of the venting arrangement based on the sensor measurements. However, such systems are complex and expensive and susceptible to operational errors.

An airbag with variable internal pressure is known from U.S. Pat. No. 6,419,267 whose internal pressure depends on the size of the vehicle occupant to be retained, and includes a passive venting arrangement. This airbag includes an inner and outer airbag cover. The inner cover includes holes or permeable fabric in a certain area, so that gas can penetrate from the gas chamber which is surrounded by the inner airbag cover into the area between the inner airbag cover and the outer airbag cover and from there can fully exit from the airbag. If a vehicle occupant strikes against the outer airbag cover, this cover is pressed in sections onto the inner airbag cover, so that a part of the holes or the permeable fabric is covered and the gas stream is reduced. The larger the occupant who strikes the airbag, the more the airstream is throttled and therefore the harder the airbag.

Because of this cover design, the airbag becomes relatively heavy and requires a relatively large volume of space when folded. Furthermore, such an airbag becomes strongly cushion-shaped during filling, so that it is difficult to implement a side airbag with this design.

In view of the above, it is apparent that there exists a need for an improved airbag capable of regulating its internal pressure that is smaller, lighter, and can be configured as a side airbag.

SUMMARY

In satisfying the above need, as well as overcoming the enumerated drawbacks and other limitations of the related art, the present invention provides an airbag that is smaller and lighter in its inactive state and that can also be configured as a side airbag. A further task of the invention is to create a vehicle including such an airbag.

The airbag of the present invention includes a venting arrangement which is formed in such a way that when a certain area of the airbag cover strikes an obstacle, in this case a vehicle occupant, the gas stream which exits from the airbag can be throttled or completely blocked to adjust the firmness of the airbag.

According to the present invention, the venting arrangement consists of at least one opening in the airbag cover and a tube joined to the cover which is connected with the airbag cover. The opening can be a hole in the airbag cover, or a gas-permeable fabric section. The tube is easy to manufacture and only slightly increases the weight and the packing volume of the airbag. The form of the impact surface is not influenced by the tube, allowing an airbag according to the present invention to also be configured for use as a side airbag.

The area of the tube is relatively small. However, in order to achieve the desired effect despite this, namely that the pressure of the airbag adapts to the size of the vehicle occupant and the accident situation, the tube must be located at a carefully selected area of the expanded airbag. In the case of a side airbag, the tube preferably extends basically horizontal at the height of the shoulders of a 50th percentile male in a standard seating position.

In the case of a front airbag, the tube preferably extends from a lower central area to the outside, and/or it extends basically horizontally in a mid to top area. It is also possible to provide several tubes running parallel to one another.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 is the side airbag of FIG. 1 installed relative to a 5th percentile female occupant in a standard seating position;

FIG. 4 is the side airbag of FIG. 1 installed relative to a 50th percentile male occupant in a standard seating position;

FIG. 5 is the occupant of FIG. 4, wherein the upper body of the male occupant is rotated forward;

FIG. 8 is the front airbag of FIG. 6 installed relative to occupants of different sizes wearing seat belts;

FIG. 9 is the front airbag of FIG. 8 showing the occupants without seat belts;

FIG. 10 is the front airbag of FIG. 9 showing a 50th percentile male occupant without a seat belt during a 30° offset frontal impact;

FIG. 11 is a second embodiment of a front airbag according to the present invention installed relative to occupants of different sizes wearing seat belts;

FIG. 12 is the embodiment of FIG. 11 showing the occupants without seat belts;

FIG. 13 is the embodiment of FIG. 12 showing a 50th percentile male occupant without a seat belt during a 30° offset frontal impact;

FIG. 16 is a side view of an alternate embodiment of a front airbag completely expanded within a motor vehicle;

FIG. 17 is a top view of the airbag of FIG. 16;

FIG. 18 is an enlarged section of the airbag of FIG. 16;

DETAILED DESCRIPTION

Figure 1:
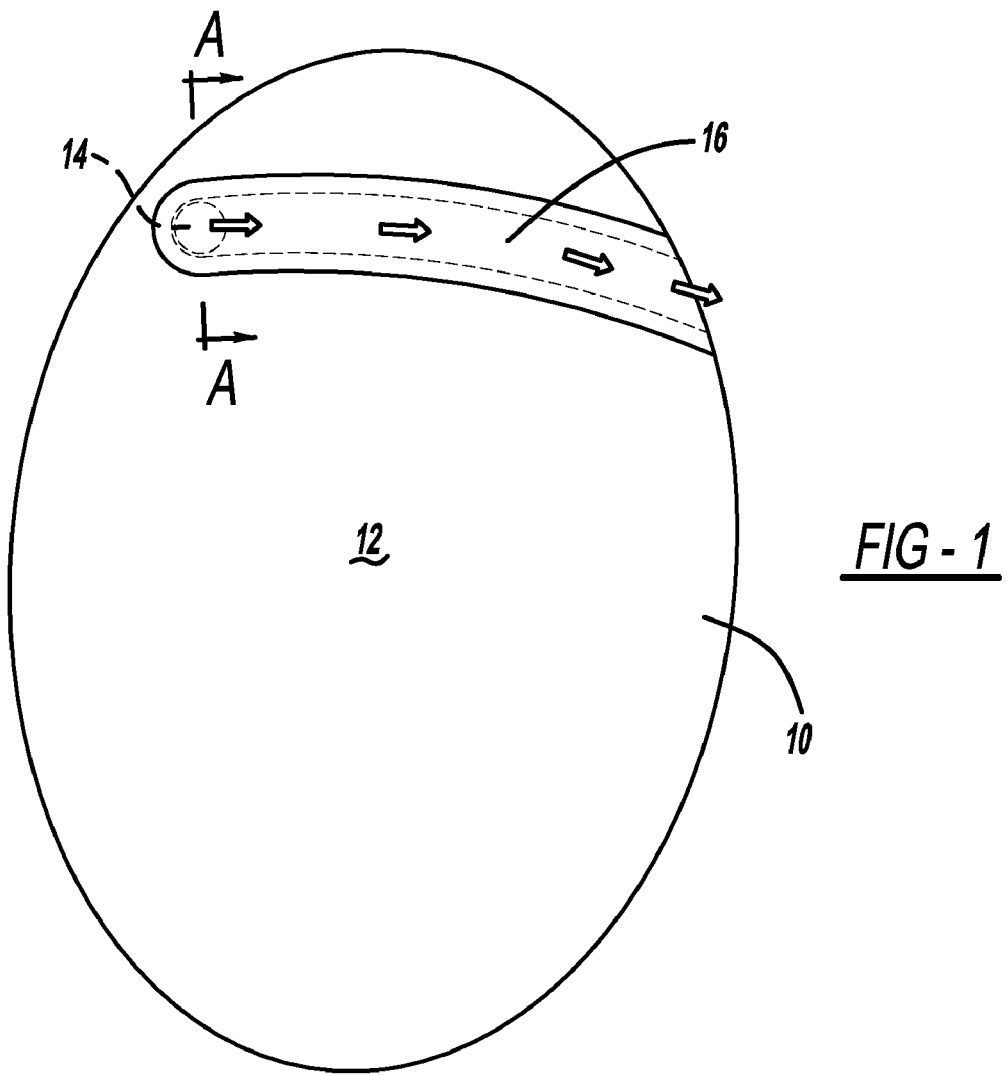
FIG. 1 is a completely expanded side airbag including a venting arrangement according to the principles of the present invention.
Figure 2:
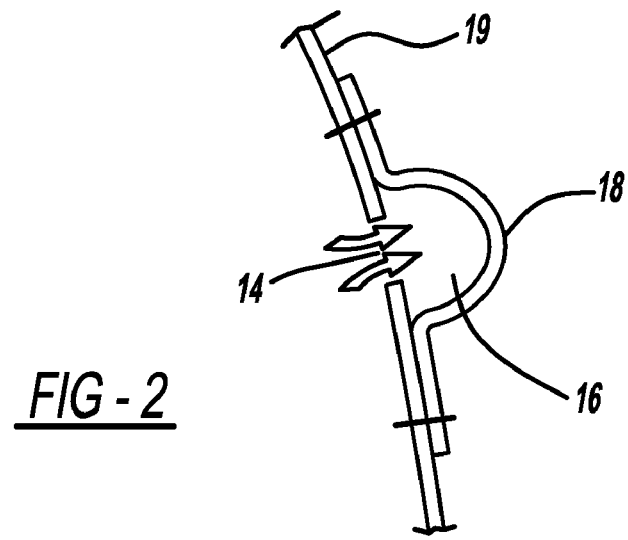
FIG. 2 is a section along the line A-A of FIG. 1.

Referring now to the drawings, an airbag embodying the principles of the present invention is illustrated therein and designated at 10. FIG. 1 shows the airbag 10 in the form of a side airbag. In an upper area of the airbag 10 an impact surface 12 of the airbag 10 includes an opening 14. From this opening 14, a tube 16 extends along a slightly bent, although mainly horizontal, path. The tube 16 is formed from a fabric element 18 which is sewn onto the airbag cover 19 of the airbag 10 (see FIG. 2). The opening 14 can be a hole in the airbag cover 19 or a gas-permeable area of the airbag cover 19. One side of the tube 16 is open, so that an exit opening to an exterior environment is formed.

In an expanded, but non-loaded state, gas flows from interior of the airbag 10, through the opening 14, into the tube 16 and from there into the interior of the motor vehicle. This flow path is maintained if the impact surface 12 is pressed in an area beneath the tube 16. However, if one presses onto the tube 16 from the outside, and the tube is fully or partly closed blocking some or all of the gas from escaping the venting arrangement, the airbag becomes more firm (i.e. pressure increases).

FIGS. 3 to 5 show the tube 16 positioned in the vehicle with a fully expanded airbag 10. FIG. 3 shows an occupant D1 of a 5th percentile female in her standard seating position. The tube 16 is at the height of the neck of the female occupant D1. In the case of a side impact, when the female D1 occupant strikes against the airbag 10 the shoulder area comes into contact with the airbag cover 19. In this case the tube 16 is not contacted, so that gas can escape through the tube 16 and the airbag becomes relatively soft.

FIGS. 4 and 5 show a 50th percentile male occupant D2. In this case, the shoulder area is at the height of the tube 16 in his standard seating position (see FIG. 4). If the male occupant strikes against the airbag 10, the gas flow through the tube 16 is blocked, no gas can escape, and the airbag becomes correspondingly harder. In general, at least one additional opening is provided, so that the airbag does not exceed a certain maximum pressure.

As can be seen from FIG. 5, where the male occupant D2 is in a rotated forward seating position, tube 16 is also blocked if the male occupant D2 strikes the airbag 10. This rotating position may result, for example, because of a sudden deceleration.

Figure 6:
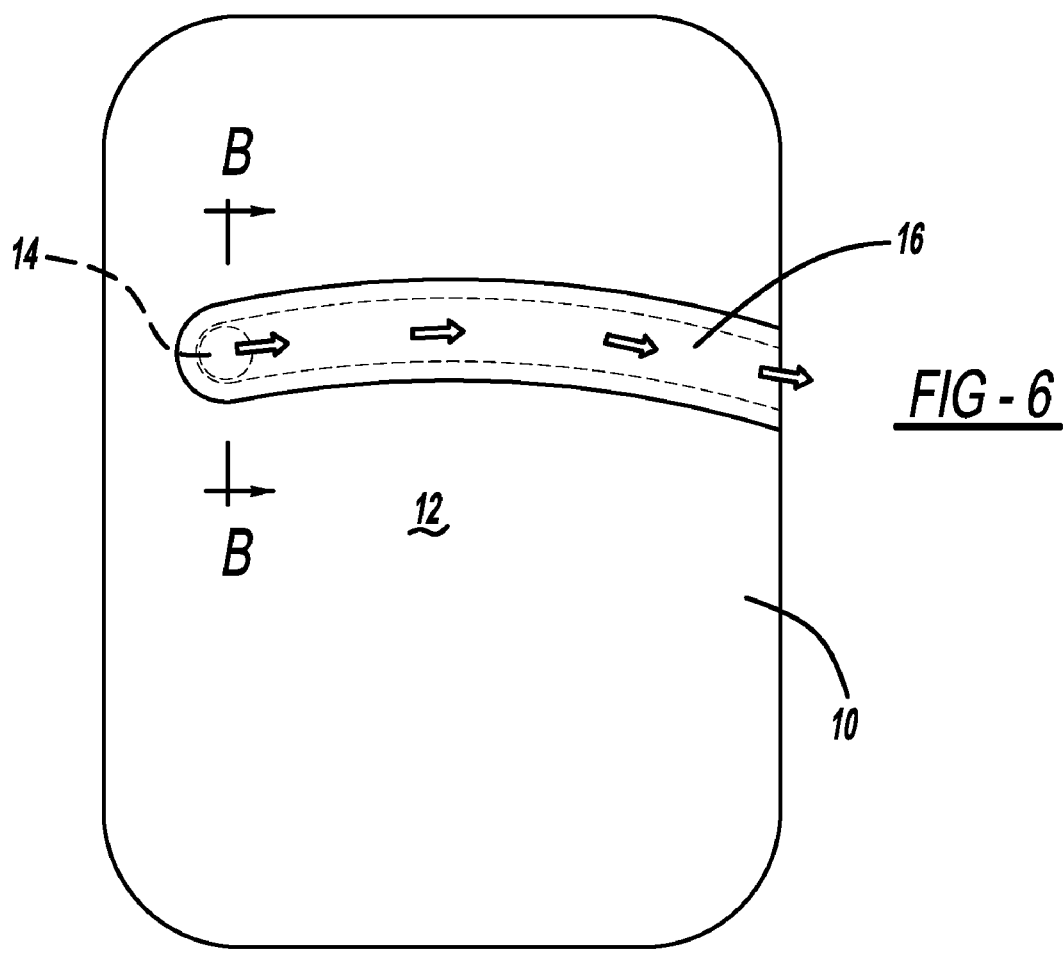
FIG. 6 is a completely expanded front airbag including a venting arrangement according to the principles of the present invention.
Figure 7:
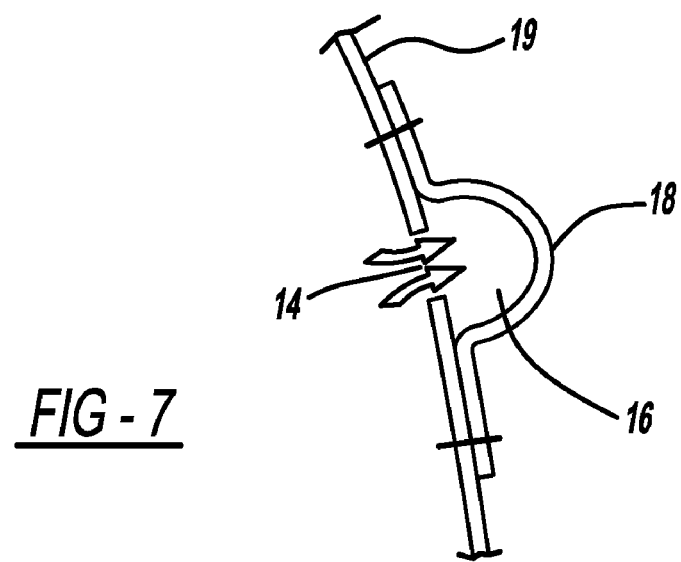
FIG. 7 is a section along the line B-B of FIG. 6.

As previously mentioned, the present invention can also be used for front airbags. FIG. 6 shows a first embodiment of such an airbag 10 designed as a front airbag. As is also the case with the side airbags mentioned above, the impact surface 12 carries the venting arrangement including an opening 14 and a tube 16. Reference can be made to the above embodiment with regard to the mode of functioning and form of the tube 16.

FIGS. 8 to 10 show the position of the front airbag of FIG. 6 in relation to different sized occupants which have fallen into the airbag 10 in different accident situations. FIG. 8 shows the situation in the case of a frontal collision with a vehicle occupant wearing a seat belt. The first occupant D1 shows a 5th percentile female and the second occupant D2 shows a 50th percentile male and the third occupant D3 a 95th percentile male, all wearing seat belts.

As can be seen, only the 95th percentile male occupant closes the venting arrangement, increasing the internal pressure and making the airbag correspondingly more firm. The venting arrangement remains open with the other two occupants.

FIG. 9 shows the same situation as above with the same types of vehicle occupants, but without wearing seat belts. Because of the greater forward displacement of the pelvis, there is a greater upper body angle and therefore a higher position of the breast area and the head. Here, the 95th percentile male and the 50th percentile male occupant close the venting arrangement if they are not wearing seat belts and the arrangement only remains open in the case of the 5th percentile female occupant. Therefore it is possible to see that the internal pressure of the airbag not only adapts to the size of the vehicle occupants, and therefore also generally speaking to their weight, but it also adapts to the accident situation, for example, with or without seat belts.

In FIG. 10, the tube 16 is shown arranged basically horizontally with a slight curve on the impact surface 12. The curved shape is selected so that the behaviour of the system is still maintained if the upper body of the vehicle occupant is tilted when it falls into the bag because of a front impact offset to the side. In FIG. 10, a 50th percentile male occupant D2 not wearing a seat belt in a frontal collision offset by 30° is shown.

In the embodiments shown up to now, there are basically only two states, namely "venting arrangement open" and "venting arrangement closed". In some applications it can naturally be desirable to achieve a kind of continuous regulation of the airbag firmness. FIGS. 11 to 13 show an embodiment of a front airbag which fulfils this requirement.

In this embodiment, the venting arrangement includes two tubes 16 each covering several openings of the airbag cover. The two tubes 16 respectively extend from a lower central area diagonally upwards. Because of this arrangement, the number of covered openings 14 in a frontal collision depends on the size of the occupant and on the accident situation, such as whether the occupant is wearing a seat belt or not.

FIG. 11 shows the situation with occupants D1-D3 of different sizes, which correspond to the occupants in FIGS. 8 to 10. It can be seen that the smallest occupant D1 covers four openings, the largest occupant D3 six openings and the central occupant D2 five openings. The airbag therefore becomes harder as the occupants to be restrained become larger.

FIG. 12 shows the situation of FIG. 11 with an occupant not wearing a seat belt. Here it can be seen that each occupant covers more openings than the embodiment of FIG. 11, so that the airbag becomes correspondingly more firm.

FIG. 13 shows the situation in a 30° diagonal impact and a 50th percentile male occupant D2 not wearing a seat belt. Because of the symmetrical structure of the tubes 16 running upwards at an angle, the number of openings 14 which are covered are the same as in the frontal collision shown in FIG. 12. This means that the behaviour of the airbag is non-variant in relation to the angle of collision impact, at least within a certain range.

The firmness of the embodiments of a front airbag described up to now does not depend on whether a pure frontal collision, or a frontal collision which is offset to the side, occurs. This is often useful and desirable. However, in some vehicle types it can be desired that the front airbag behaves differently in the case of a frontal collision offset to the side than in a pure frontal collision and particularly that the airbag exhibits greater holding capacity as regards the occupant in the case of a frontal collision offset to the side.

Figure 14:
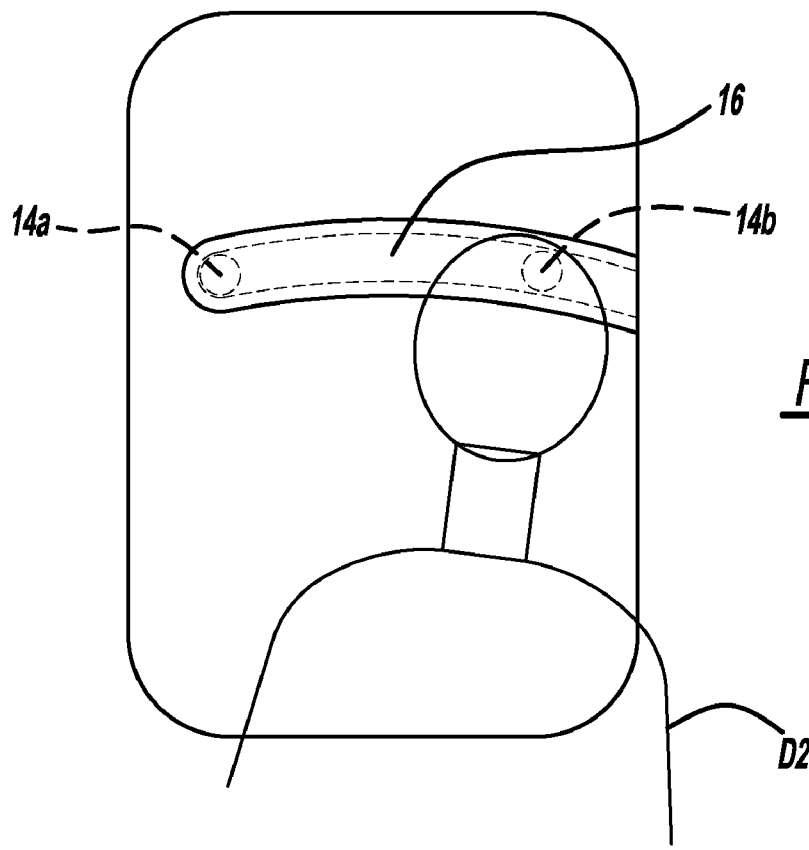
FIG. 14 is another embodiment of the front airbag of FIG. 6.

FIG. 14 shows a variation of the airbag shown and described in FIGS. 6 to 10 with FIG. 14 corresponding to the situation of FIG. 10. In addition to a first opening 14a, the airbag cover includes a second opening 14b, which opens into the tube 16. In the case of a diagonally offset collision, as shown in FIG. 14, both openings 14a and 14b are blocked and the airbag reaches its maximum firmness. In the case of the pure frontal collision, see again, for example, FIGS. 8 and 9, only the gas stream from the first opening 14a is blocked, while the second opening 14b remains open and the airbag has a lesser firmness.

Figure 15:
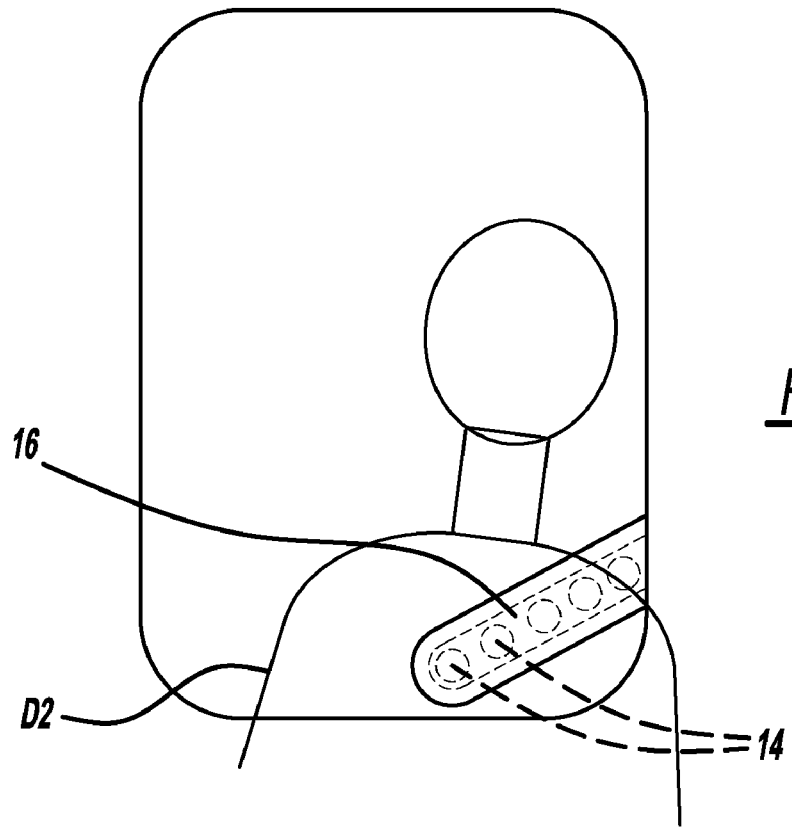
FIG. 15 is another embodiment of the front airbag of FIG. 11.

FIG. 15 shows a variation of the front airbag described in FIGS. 11 to 13. In this embodiment, there is only one tube 16, in which several holes 14 end. In the case of a diagonal impact, more holes 14 are covered, and there is no compensation for this by means of a symmetrically arranged additional tube 16, so that the airbag can have a greater internal pressure in the case of a diagonally offset front impact.

The tubes 16 extend to the edge of the airbag in all embodiments, so that the occupant cannot come into contact with hot gases being expelled from the airbag.

The embodiment shown in FIGS. 16 to 21 includes several tubes 16 which are arranged in parallel on the impact surface 12 of an airbag 10 configured as a passenger airbag, which serve as venting channels. FIG. 16 shows the activated state, in which the airbag 10 is filled with gas. To simplify the drawings, the additional components required to activate the airbag 10 are not shown. FIG. 16 shows the occupant D2 which is about to move towards the airbag 10 which is filled with gas.

The arrangement of the tubes of airbag 10 can be seen in a top view of airbag 10 shown in FIG. 17. One opening 14 (see FIG. 18) opens into tubes (i.e., venting channels) 16, 16', 16" respectively. When the airbag 10 is inflated by being filled with gas, the gas flows out of the openings 14 causing tubes 16, 16', 16" to be inflated. In the embodiment shown here, the openings 14 open into the tube a distance between the two open ends of the tubes 16, 16', 16" at approximately the center between the two ends.

Figure 19:
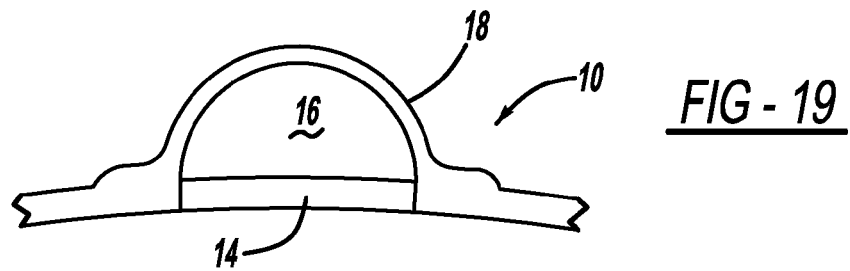
FIG. 19 is a section through the tube of the airbag of FIG. 16.
Figure 20:
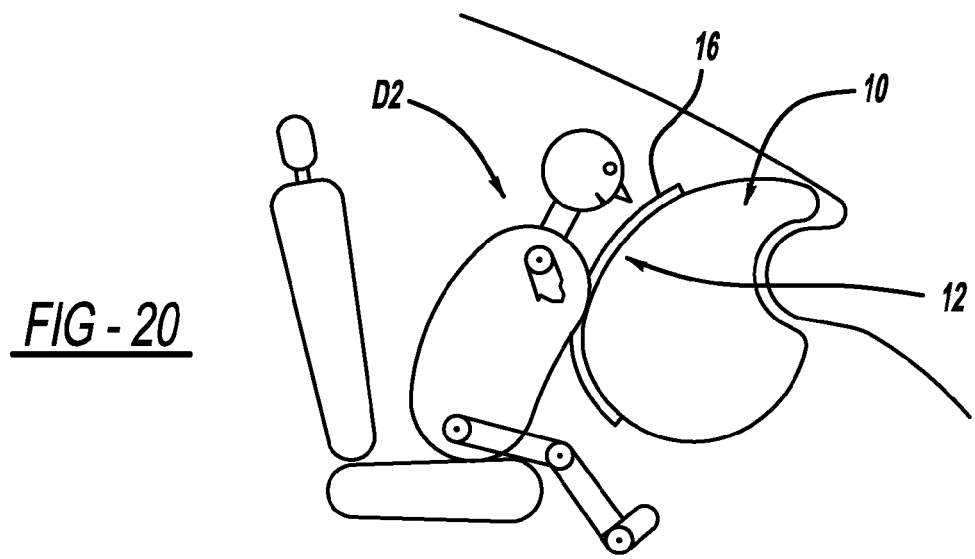
FIG. 20 is a side view of the airbag of FIG. 16 showing an occupant impacting the airbag.
Figure 21:
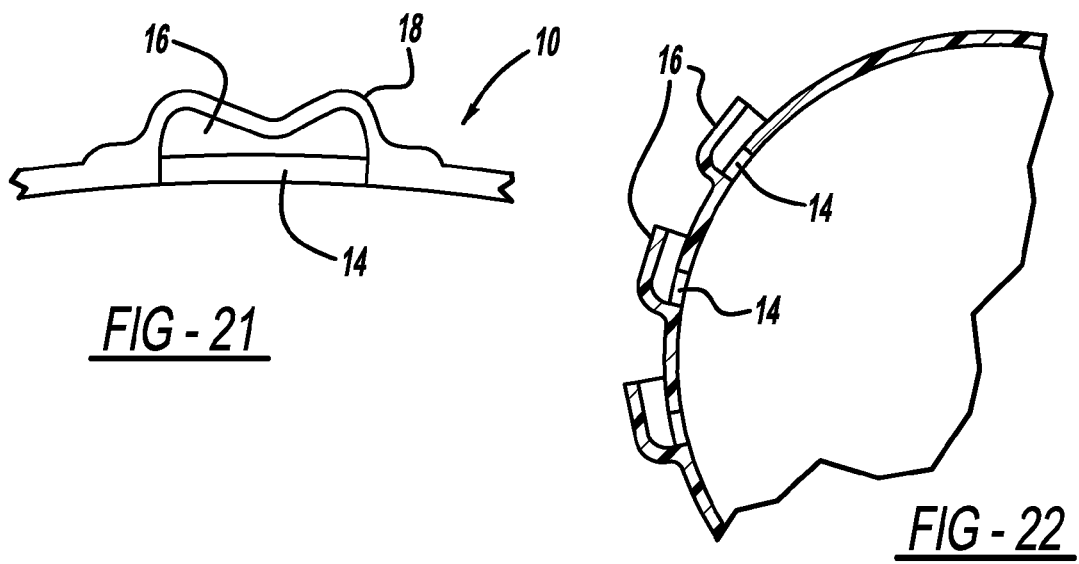
FIG. 21 is a section of the tube of FIG. 19 shown during the impact of the occupant as illustrated in FIG. 20.

Tubes 16, 16', 16" are each formed by a fabric element 18 connected with the cover of the airbag 10, as shown in the section view of FIG. 19. The fabric element 18 is the same material as the airbag 10. This means that each fabric element 18 is flexible and in this embodiment takes on approximately the cross-sectional form shown in FIG. 19. The cross-section through the tube 16 shown in FIG. 19 is represented in the area of the opening 14 which opens into the tube 16. The fabric elements 18 of the tubes 16 rise off of the impact surface 12 of the airbag 10 towards the occupant D2 because of the pressure in the airbag 10 and exiting through the openings 14 into the tubes 16, 16', 16". Depending on the kinetic energy with which the occupant D2 strikes the impact surface 12 of the airbag 10, the tubes 16, 16', 16" are more or less deformed with regard to their cross-sectional surface, as shown in FIGS. 20 and 21. The flexible and yielding characteristics of the fabric elements 18 of the tubes 16, 16', 16" are utilized here. If the occupant D2 strikes the tubes 16, 16', 16" of the airbag 10 with a higher kinetic energy, the free cross-sectional surface available for venting the airbag 10 in the area of the impact is correspondingly reduced and therefore its free capacity as regards gas throughflow is reduced, so that the gas contained in the airbag 10 escapes more slowly. As a result, the airbag 10 is harder compared with the situation when the occupant D2 meets the activated airbag with a lower kinetic energy. In such a case, the free cross-sectional surface of the tubes 16, 16', 16" is reduced to a lesser extent (if at all) and the airbag 10 is softer since the gas contained in it can flow out through the larger cross-sectional flow area more quickly.

Figure 22:
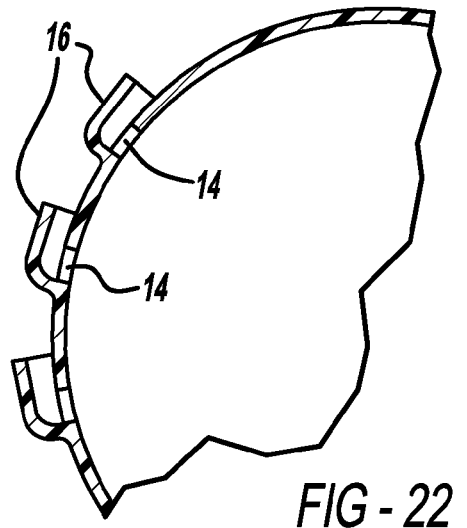
FIG. 22 is a section of an airbag showing an alternate embodiment of the tube of FIG. 19.

FIG. 22 shows a section of yet another airbag 10 that includes a large number of openings 14, which each open into a short tube 16. In this embodiment, the tubes 16 serve the same purpose as the tubes in the embodiment described in FIGS. 16 to 21. The intention of the embodiment shown in FIG. 22 is to demonstrate that the tubes 16 can, in principle, be extremely short.

Figure 23:
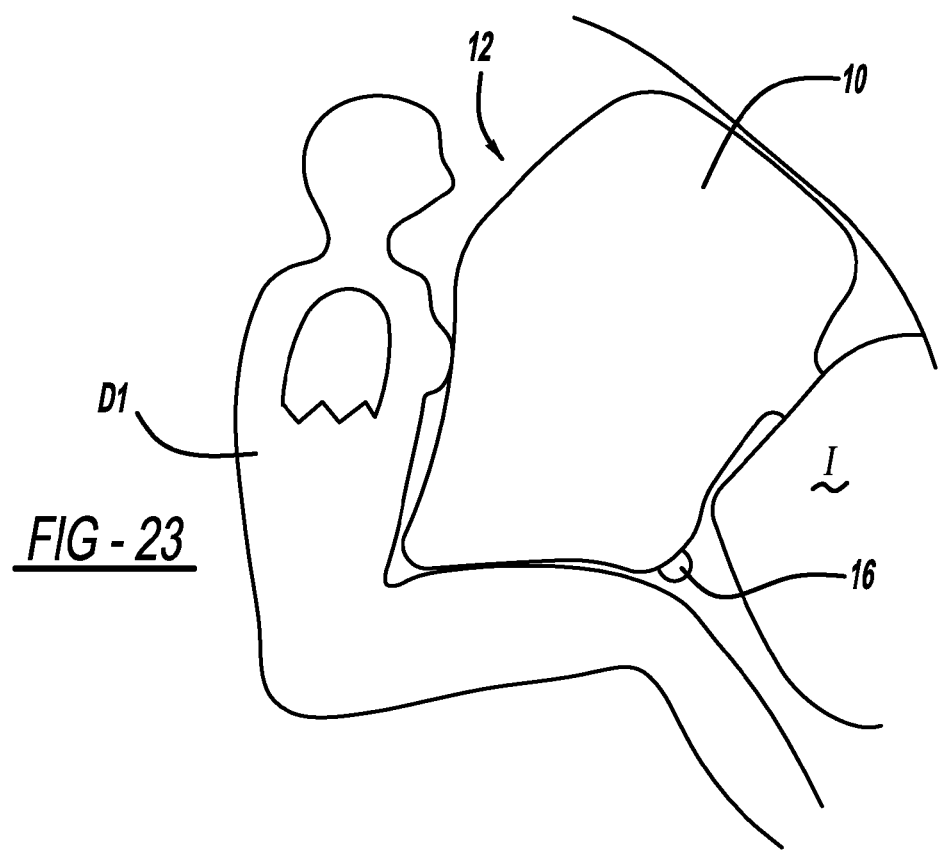
FIG. 23 is a side view of a third embodiment of a front airbag, configured as a passenger airbag, in contact with a female occupant.
Figure 24:
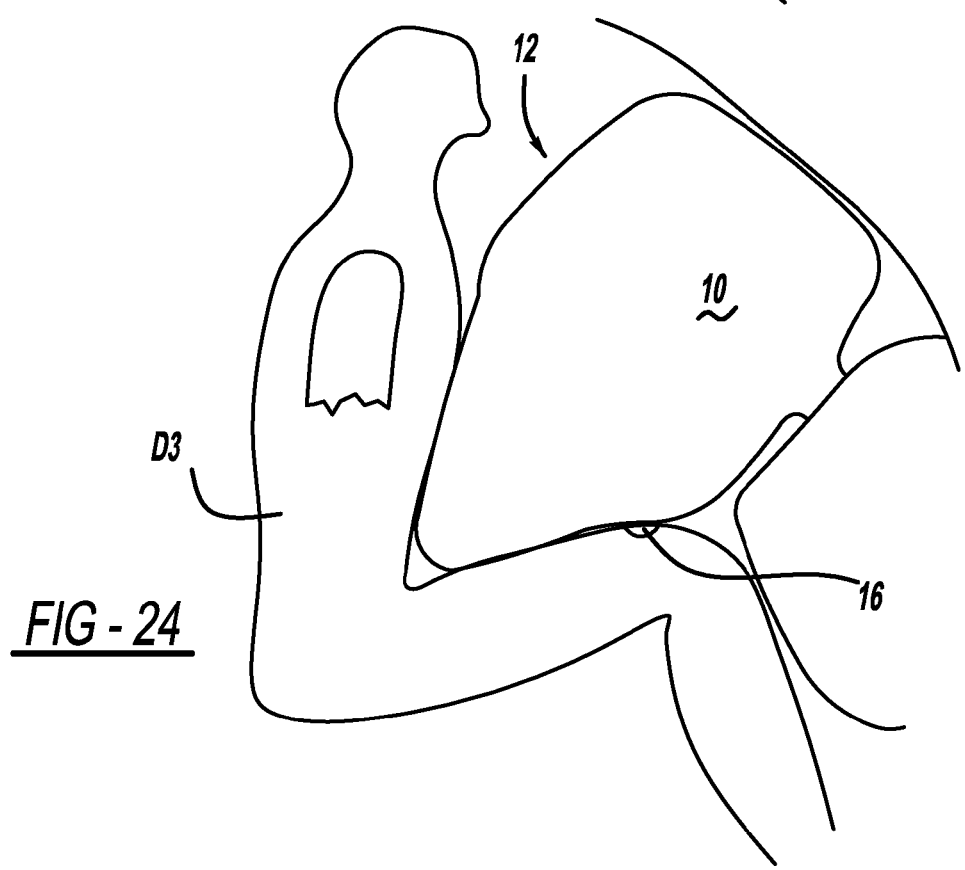
FIG. 24 is the passenger airbag of FIG. 23 in contact with a male occupant.

FIGS. 23 and 24 show another example of a front passenger airbag. Here, the tube 16, in which the openings 14 (not shown) end, is located in an area which, when the airbag is fully expanded, is in an area in front of the instrument panel 1. The tube 16 extends basically horizontally along the longitudinal axis of the vehicle.

FIG. 23 shows the situation with an occupant D1 representing a 5th percentile woman, contact the airbag 10. Here, the upper body of occupant D1 is already displaced forwards following the collision. It can be seen that the knee area of the occupant D1 does not touch the tube 16, so that the airbag 10 is vented by the tube 16. The airbag is therefore relatively soft.

FIG. 24 shows the situation with an occupant D3 which represents a 95th percentile male contacting the airbag 10. Due to the clearly longer length of the legs of the occupant D3, compared with the occupant D1, after a certain forwards displacement, an area above the knee of the occupant D3 presses on and closes the tube 16. The airbag 10 is not vented, or only slightly vented, through the tube 16, resulting in a desired increase in internal pressure and therefore firmness of the airbag.

The location of the tube 15 in the area shown here in front of the instrument panel 1, and the spatial relationship of the tube 16 to the knees at an area shortly above the knees of the occupant has the advantage that adjustment of the internal pressure already takes place completely, or at least in part, before the upper body of an occupant meets the impact surface 12. In addition, because of the different leg lengths of different size occupants, small and large occupants can be differentiated with a high degree of reliability.

As a rule an additional venting opening is present in all embodiments relating to a front airbag, so that a certain maximum pressure is maintained even if the tube or tubes 16 are completely blocked.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. An airbag for use in a motor vehicle comprising:
an airbag cover enclosing a gas chamber and having an exterior surface facing an exterior environment; and at least one venting arrangement which fluidly connects the gas chamber to the exterior environment, wherein
a gas flow is throttled or blocked by the venting arrangement when a certain area of the airbag cover meets an obstacle, and
the venting arrangement includes at least one opening in the airbag cover, and
further includes at least one tube having a fabric element fixed on the exterior surface of the airbag cover so that a part of tube walls of the tube are formed of a section of the airbag cover, the tube communicating with the at least one opening in the airbag cover, and the tube includes an exit opening open to the exterior environment, the fabric element located on a side of the airbag cover which faces occupants of the motor vehicle.

2. An airbag according to claim 1, wherein the exit opening is one end of the tube.

3. An airbag according to claim 2, wherein two ends of the tube are exit openings.

4. An airbag according to claim 1 further comprising a plurality of openings in the airbag cover opening to the at least one tube.

5. An airbag according to claim 1 further comprising at least one additional venting opening in the airbag cover positioned such that the additional opening does not open in the at least one tube.

6. An airbag according to claim 1 in the form of a side airbag, the side airbag further comprising the tube being located at a shoulder height of a fiftieth percentile male when located in a normal seating position with the airbag expanded.

7. A motor vehicle including a front airbag, the front airbag comprising:
an airbag cover enclosing a gas chamber and having an exterior surface that faces an exterior environment and which includes an impact surface; and at least one venting arrangement which fluidly connects the gas chamber to the exterior environment, wherein
a gas flow is throttled or blocked when a certain area of the airbag cover meets an obstacle, and
the venting arrangement includes at least one opening in the airbag cover, and
the venting arrangement also includes at least one tube disposed on the exterior surface of the airbag cover and located on the impact surface of the airbag and connected with the airbag cover and communicating with the at least one opening in the airbag cover, and the tube includes an exit opening open to the exterior environment.

8. A motor vehicle according to claim 7, wherein the at least one tube is located on the impact surface extends in an angled upward direction from a lower central area of the impact surface.

9. A motor vehicle according to claim 7, wherein the front airbag further comprises a plurality of openings in the airbag cover.

10. A motor vehicle according to claim 7, wherein the front airbag further comprises two of the venting arrangements which are symmetrically arranged.

11. A motor vehicle according to claim 7, wherein the tube on the impact surface extends substantially horizontally across the impact surface from a central upper area.

12. A motor vehicle according to claim 11, wherein the front airbag further comprises at least two openings in the airbag cover.

13. A motor vehicle according to claim 7, wherein the front airbag is a passenger airbag and the tube is located on an area of the exterior surface of the airbag cover between the impact surface and an instrument panel of the motor vehicle, and the tube extends basically at an angle to the longitudinal direction of the vehicle.

14. A motor vehicle according to claim 13, wherein the tube is located approximately at a knee level of a vehicle occupant.

15. An airbag for use in a motor vehicle comprising:
an airbag cover enclosing a gas chamber and having an exterior surface facing an exterior environment; and at least one venting arrangement which fluidly connects the gas chamber to the exterior environment, wherein
a gas flow is throttled or blocked by the venting arrangement when a certain area of the airbag cover meets an obstacle,
the venting arrangement includes at least one opening in the airbag cover, and
the venting arrangement also includes at least one tube disposed on the exterior surface of the airbag cover and connected with the airbag cover in which the at least one opening ends, and the tube includes an exit opening to the exterior environment, and
wherein the tube is positioned such that upon deployment of the airbag, a large occupant of the motor vehicle will contact the tube and block the gas flow to the exterior environment and a small occupant will not contact the tube, permitting the gas flow to flow to the exterior environment through the venting arrangement.

16. An airbag according to claim 15, wherein the large occupant includes a fiftieth percentile male.

17. An airbag according to claim 15, wherein the small occupant includes a fifth percentile female.

* * * * *